(12) United States Patent
Abe et al.

(10) Patent No.: US 10,108,187 B2
(45) Date of Patent: Oct. 23, 2018

(54) CONTROL DEVICE, CONTROL SYSTEM, SUPPORT DEVICE, AND CONTROL-DEVICE MAINTENANCE MANAGEMENT METHOD

(71) Applicant: OMRON Corporation, Kyoto-shi, Kyoto (JP)

(72) Inventors: Yutaka Abe, Ritto (JP); Takehiko Hioka, Otsu (JP); Shinsuke Kawanoue, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 140 days.

(21) Appl. No.: 15/123,301

(22) PCT Filed: Jan. 15, 2015

(86) PCT No.: PCT/JP2015/050880
§ 371 (c)(1),
(2) Date: Sep. 2, 2016

(87) PCT Pub. No.: WO2015/136966
PCT Pub. Date: Sep. 17, 2015

(65) Prior Publication Data
US 2017/0068240 A1 Mar. 9, 2017

(30) Foreign Application Priority Data
Mar. 14, 2014 (JP) ................................ 2014-052681

(51) Int. Cl.
*G05B 9/02* (2006.01)
*G05B 23/02* (2006.01)
(Continued)

(52) U.S. Cl.
CPC ....... *G05B 23/0208* (2013.01); *G05B 19/042* (2013.01); *G05B 19/05* (2013.01);
(Continued)

(58) Field of Classification Search
CPC ............ G05B 23/0208; G05B 23/0286; G05B 19/042; G05B 19/05; G05B 2219/25112; G06F 11/00
See application file for complete search history.

(56) References Cited

U.S. PATENT DOCUMENTS 6,321,979 B1 * 11/2001 Hanagata .............. G06F 3/0607
235/375
7,978,580 B1 * 7/2011 Kivits ................ G11B 7/00458
369/44.29
(Continued)

FOREIGN PATENT DOCUMENTS

CN 1229483 A 9/1999
CN 101151597 A 3/2008
(Continued)

OTHER PUBLICATIONS

The partial supplementary European search report dated Oct. 27, 2017 in the counterpart European patent application.
(Continued)

*Primary Examiner* — Adam Lee
(74) *Attorney, Agent, or Firm* — Metrolexis Law Group, PLLC (57) ABSTRACT

A support device executes a maintenance operation for a PLC, and records, into the PLC, information identifying the maintenance operation. The maintenance operation includes at least either of writing and deleting of data such as firmware into/from the PLC. The support device may further record, into the support device itself, information identifying the maintenance operation. In addition, the PLC uses data stored in a recording medium to execute a maintenance operation for the PLC. At this time, the PLC records, into the PLC itself, information identifying the maintenance operation. The PLC may further record, into the recording
(Continued)

medium, the information identifying the maintenance operation.

10 Claims, 8 Drawing Sheets

(51) Int. Cl.
    *G05B 19/05* (2006.01)
    *G06F 11/00* (2006.01)
    *G05B 19/042* (2006.01)
(52) U.S. Cl.
    CPC .......... *G05B 23/0286* (2013.01); *G06F 11/00* (2013.01); *G05B 2219/25112* (2013.01)

(56) References Cited

U.S. PATENT DOCUMENTS

| | | | |
|---|---|---|---|
| 8,868,796 B1* | 10/2014 | Wojcik | G06F 8/71 710/8 |
| 2002/0144005 A1* | 10/2002 | Mae | G06F 8/65 719/310 |
| 2005/0050402 A1 | 3/2005 | Koda et al. | |
| 2005/0055595 A1* | 3/2005 | Frazer | G06F 8/665 713/400 |
| 2005/0186952 A1* | 8/2005 | Kitajima | H04M 3/42178 455/419 |
| 2006/0107071 A1* | 5/2006 | Girish | G06F 11/1433 713/191 |
| 2006/0200707 A1* | 9/2006 | Shishido | G06F 11/1433 714/100 |
| 2008/0109647 A1* | 5/2008 | Gavens | G06F 8/65 713/2 |
| 2008/0109676 A1 | 5/2008 | Hama et al. | |
| 2008/0320471 A1 | 12/2008 | Maeda | |
| 2009/0028012 A1* | 1/2009 | Yanagida | G11B 19/04 369/47.1 |
| 2009/0241099 A1* | 9/2009 | Lee | G06F 8/65 717/168 |
| 2011/0179407 A1* | 7/2011 | Minegishi | G06F 8/65 717/170 |
| 2012/0124568 A1* | 5/2012 | Fallon | G06F 8/65 717/169 |
| 2012/0173953 A1* | 7/2012 | Flynn | G06F 8/665 714/758 |
| 2012/0246628 A1* | 9/2012 | Li | G06F 8/65 717/168 |
| 2013/0198443 A1 | 8/2013 | Braun et al. | |
| 2013/0304234 A1 | 11/2013 | Szurek et al. | |
| 2013/0318516 A1* | 11/2013 | Knapton | G06F 8/665 717/168 |
| 2014/0208092 A1* | 7/2014 | Huang | G06F 8/665 713/2 |
| 2015/0293770 A1* | 10/2015 | Orii | G06F 11/004 710/9 |
| 2018/0039491 A1* | 2/2018 | Bamba | G06F 13/00 |

FOREIGN PATENT DOCUMENTS

| | | |
|---|---|---|
| EP | 0923026 A1 | 6/1999 |
| JP | 2002-297388 A | 10/2002 |
| JP | 2006-330866 A | 12/2006 |
| JP | 2006-330867 A | 12/2006 |
| JP | 2008-102865 A | 5/2008 |
| JP | 2008-257415 A | 10/2008 |
| JP | 2009-032076 A | 2/2009 |
| JP | 2009-223586 A | 10/2009 |
| JP | 2010-097478 A | 4/2010 |
| WO | 98/58310 A1 | 12/1998 |
| WO | 2013168224 A1 | 11/2013 |

OTHER PUBLICATIONS

Japanese Official Action dated Sep. 12, 2017 in the counterpart Japanese patent application.
Anonymous, "PLC Program Download Device Model PPDD", Oct. 1, 2010, 14 pages, Retrieved from the Internet: URL:http://files.engineering.com/download.aspx?folder=61f0b0f3-ee30-4e1f-8038-7f3804e35168&file=GFK2473D.pdf [retrieved on Sep. 11, 2017] Relevance is indicated in the EESR dated Mar. 9, 2018.
The extended European search report (EESR) dated Mar. 9, 2018 in a counterpart European Patent application.
The Chinese Office Action (CNOA) dated Mar. 9, 2018 in a counterpart Chinese patent application.

* cited by examiner

PLC: S/N 12345

| | Date and time | Device | Content |
|---|---|---|---|
| 1 | 2014/1/5 - 09:10:15 | PC:AAA | FW version up V2.01 |
| 2 | 2014/1/8 - 14:57:01 | SD:2B63-3AA4 | Robot function added V1.01 |
| 3 | 2014/1/9 - 10:01:01 | PC:BBB | DB connection function deleted V1.00 |

Fig. 6

PC: AAA

| | Date and time | PLC | Content |
|---|---|---|---|
| 1 | 2014/1/5 - 09:10:15 | S/N 12345 | FW version up V2.01 |
| 2 | 2014/1/5 - 09:15:08 | S/N 23456 | FW version up V2.01 |
| 3 | 2014/1/7 - 11:42:53 | S/N 45678 | DB connection function added V1.00 |

Fig. 7

SD memory card: ID 2B63-3AA4

| | Date and time | PLC | Content |
|---|---|---|---|
| 1 | 2014/1/8 - 14:51:16 | S/N 56789 | Robot function added V1.01 |
| 2 | 2014/1/8 - 14:57:01 | S/N 12345 | Robot function added V1.01 |

PC: AAA

|   | Date and time | Device | PLC | Content |
|---|---|---|---|---|
| 1 | 2014/1/5 - 09:10:15 | PC | S/N 12345 | FW version up V2.01 |
| 2 | 2014/1/5 - 09:15:08 | PC | S/N 23456 | FW version up V2.01 |
| 3 | 2014/1/7 - 11:42:53 | PC | S/N 45678 | DB connection function added V1.00 |
| 4 | 2014/1/8 - 14:57:01 | SD: 2B63-3AA4 | S/N 12345 | Robot function added V1.01 |
| 5 | 2014/1/9 - 10:01:01 | PC:BBB | S/N 12345 | DB connection function deleted V1.00 |

Fig. 12

PC: AAA

|   | Date and time | Device | PLC | Content |
|---|---|---|---|---|
| 1 | 2014/1/5 - 09:10:15 | PC | S/N 12345 | FW version up V2.01 |
| 2 | 2014/1/5 - 09:15:08 | PC | S/N 23456 | FW version up V2.01 |
| 3 | 2014/1/7 - 11:42:53 | PC | S/N 45678 | DB connection function added V1.00 |
| 4 | 2014/1/8 - 14:51:16 | SD: 2B63-3AA4 | S/N 56789 | Robot function added V1.01 |
| 5 | 2014/1/8 - 14:57:01 | SD: 2B63-3AA4 | S/N 12345 | Robot function added V1.01 |
| 6 | 2014/1/9 - 10:01:01 | PC:BBB | S/N 12345 | DB connection function deleted V1.00 |

Fig. 13

PC: AAA

|   | Date and time | Device | PLC | Content |
|---|---|---|---|---|
| 1 | 2014/1/5 - 09:10:15 | PC | S/N 12345 | FW version up V2.01 |
| 2 | 2014/1/5 - 09:15:08 | PC | S/N 23456 | FW version up V2.01 |
| 3 | 2014/1/6 - 15:25:34 | SD: 3C87-2EB5 | S/N 34567 | FW version up V2.01 |
| 4 | 2014/1/7 - 11:42:53 | PC | S/N 45678 | DB connection function added V1.00 |
| 5 | 2014/1/8 - 14:51:16 | SD: 2B63-3AA4 | S/N 56789 | Robot function added V1.01 |
| 6 | 2014/1/8 - 14:57:01 | SD: 2B63-3AA4 | S/N 12345 | Robot function added V1.01 |
| 7 | 2014/1/9 - 10:01:01 | PC:BBB | S/N 12345 | DB connection function deleted V1.00 |

# CONTROL DEVICE, CONTROL SYSTEM, SUPPORT DEVICE, AND CONTROL-DEVICE MAINTENANCE MANAGEMENT METHOD

TECHNICAL FIELD

The present invention relates to a maintenance operation for a control device for controlling a factory automation (FA) system such as production system.

BACKGROUND ART

A control device, such as programmable logic controller (PLC), controls an FA system installed in a manufacturing site or similar sites in a production factory by executing an arithmetic operation in accordance with a control program. In such a control device, a suitable program can be installed to update an already installed program. In addition, in such a control device, a suitable program can be installed to add a function. Various techniques have been proposed so far for downloading a program into a control device. For example, Japanese Unexamined Patent Publication No. 2002-297388 (Patent Document 1) proposes a method for downloading only part of a system program.

In addition, for a control device, Japanese Unexamined Patent Publication No. 2009-223586 (Patent Document 2) discloses a technique for recording, into the control device, information on an error occurred in the control device.

PRIOR ART DOCUMENTS

Patent Documents

Patent Document 1: Japanese Unexamined Patent Publication No. 2002-297388
Patent Document 2: Japanese Unexamined Patent Publication No. 2009-223586

SUMMARY OF THE INVENTION

Problems to be Solved by the Invention

As disclosed in Patent Document 2, a control device records, if an error occurs, information on the error. However, the control device does not record its status information unless an error occurs. Therefore, a content of a maintenance operation after normally executed without an error in such an above described control device has been difficult to review. Due to this reason, the control device has to be analyzed in detail to review if the control device operates normally.

In addition, in a manufacturing site or a similar site in a production factory, in which the above described control device is used, an operator is required to execute a maintenance operation, including downloading a program, for the control device, without permission by a supervisor in the site. In such a case, a required review for the control device through a detailed analysis, as described above, could bother the supervisor. In particular in recent years in which companies globally expand their scales, a company may own some production factories in multiple countries. In view of such a situation, some production factories can present in other countries, in addition to a country in which a substantial supervisor of the production factories resides. In such a case, the above described substantial supervisor has to take some efforts to visit each of the countries in which the production factories present in order to analyze control devices.

In view of the above circumstances, the present invention has an object to provide devices, a system, and a method over which a history of maintenance operations taken for each control device can easily be confirmed.

Means for Solving the Problem

According to an aspect, a control device for controlling a production system is provided. The control device includes a storage device, and a processor configured to write, into the storage device, firmware used for the control device and recorded in a portable recording medium. The processor is configured to write, into the storage device, information identifying that firmware is written.

Preferably, the information identifying that firmware is written includes information identifying a name of the firmware written into the storage device.

Preferably, the information identifying that firmware is written includes information identifying the portable recording medium.

According to another aspect, a control system including a control device for controlling a production system, and a support device capable of communicating with the control device is provided. The control device includes a first storage device, and a first interface for communicating with the support device. The support device includes a second storage device, a second interface for communicating with the control device, and a controller configured to write, into the first storage device, via the second interface, firmware used for the control device and recorded in the second storage device. The controller is further configured to write, into the first storage device, information identifying that firmware is written.

Preferably, the controller further writes, into the second storage device, information identifying that firmware is written. The support device further includes a displaying unit configured to display the information written in the first storage device to identify that firmware is written, and the information written in the second storage device to identify that firmware is written.

Preferably, the control device further includes a processor configured to write, into the first storage device, firmware used for the control device and recorded in a portable recording medium detachable to and from the control device. The processor is configured to write, into the first storage device, information identifying that firmware recorded in the portable recording medium is written into the first storage device. The displaying unit is further configured to display the information identifying that firmware recorded in the portable recording medium is written into the first storage device.

According to still another aspect, a support device capable of communicating with a control device for controlling a production system is provided. The support device includes a storage device, an interface for communicating with the control device, and a controller configured to write, into the control device, via the interface, firmware used for the control device and recorded in the storage device. The controller is configured to write, into the control device, information identifying that firmware used for the control device is written.

Preferably, the information identifying that firmware used for the control device is written includes information identifying the control device.

According to still another aspect, a maintenance management method for a control device, executed by a computer of the control device for controlling a production system, is provided. The management method includes a step of writing, into a storage device of the control device, firmware used for the control device and recorded in a portable recording medium, and a step of writing, into the storage device of the control device, information identifying that firmware is written.

Preferably, the information identifying that firmware is written includes information identifying the portable recording medium.

According to still another aspect, a method for managing writing of firmware into a control device for controlling a production system, executed by a support device capable of communicating with the control device, is provided. The management method includes a step of writing, into the control device, firmware used for the control device, and a step of writing, into the control device, information identifying that firmware used for the control device is written.

Preferably, the information identifying that firmware used for the control device is written includes information identifying the control device.

According to still another aspect, a control device for controlling a production system is provided. The control device includes a storage device, and a processor configured to delete, from the storage device, firmware used for the control device. The processor is configured to write, into the storage device, information identifying that firmware is deleted.

Effect of the Invention

According to the present invention, at least one of information identifying that firmware is written and information identifying that firmware is deleted is recorded into a control device. Accordingly, at least one of a history showing that firmware is written and a history showing that firmware is deleted is record into the control device. Therefore, the history can provide a maintenance history on firmware in the control device for easy confirmation. In particular, when the control device can make a communication via a network, a substantial supervisor in a manufacturing site can remotely see and confirm the maintenance history on firmware used for the control device disposed in the manufacturing site.

MODE FOR CARRYING OUT THE INVENTION

An embodiment of the present invention will now be described in detail with reference to the drawings. At this point, identical numerals and symbols apply to identical or equivalent components shown in the drawings so as not to repeat description of the components.

<Configuration of Control System>

Figure 1:
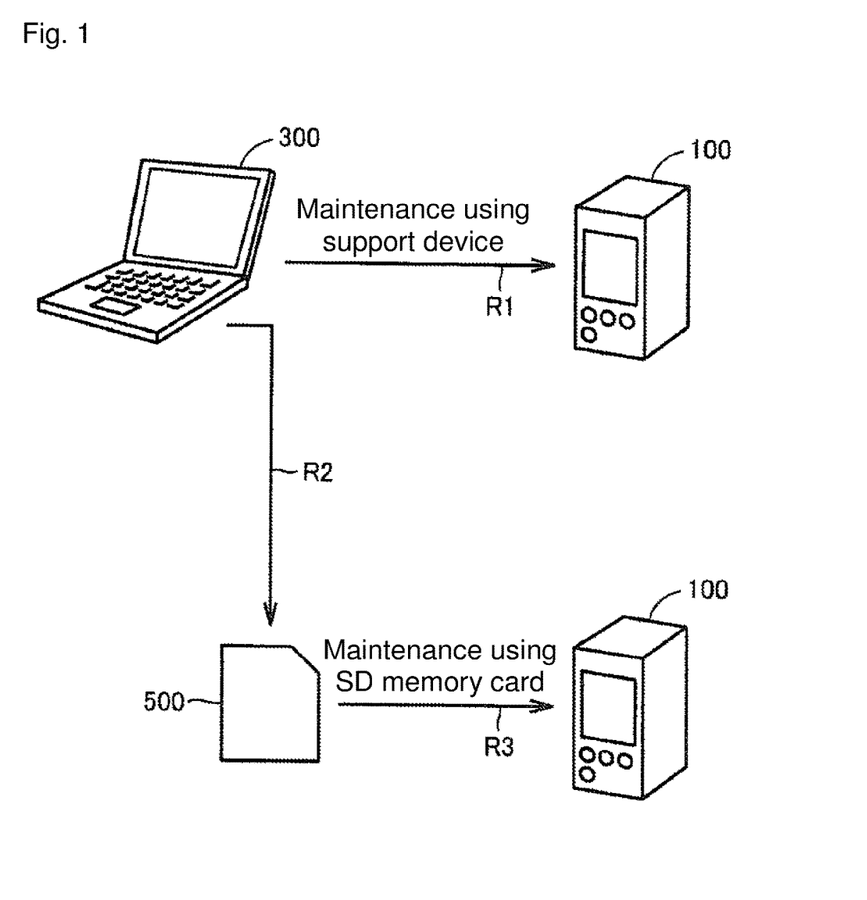
FIG. 1 is a view schematically illustrating an example configuration of a control system according to an embodiment of the present invention.

FIG. 1 is a view schematically illustrating an example configuration of a control system according to an embodiment of the present invention. As shown in FIG. 1, the control system includes a PLC 100 and a support device 300. The PLC 100 is an example control device for controlling an FA system. The PLC 100 controls, in the FA system, for example, operations of a relay and a servo motor driver driving a motor. The support device 300 is an example information processing device capable of communicating with the PLC 100. The support device 300 is, for example, a general-purpose computer. The support device 300 sets various parameters, and performs programming, monitoring, debugging, and other tasks for programs to be executed in the PLC 100.

In the control system shown in FIG. 1, the support device 300 executes a maintenance operation for the PLC 100. With the embodiment, writing and deleting firmware into/from a nonvolatile memory 126 of the PLC 100, among various operations included in maintenance operations, will now mainly be described. As described later, the PLC 100 includes an arithmetic operation device (processor 122 shown in FIG. 3) to control an FA system by allowing the arithmetic operation device to execute a program. The maintenance operations for the PLC 100 include, for example, writing, into the PLC 100, data for use in controlling the FA system. In an example maintenance operation, as indicated by an arrow R1 in FIG. 1, the support device 300 writes data into the PLC 100.

In the control system shown in FIG. 1, as indicated by an arrow R3 in FIG. 1, the PLC 100 can also write, into the PLC 100 itself, data recorded in a recording medium 500 to execute a maintenance operation for the PLC 100. The data recorded in the recording medium 500 may be, as indicated by an arrow R2 in FIG. 1, written into the recording medium 500 itself by the support device 300 or another device.

In the control system shown in FIG. 1, the PLC 100 can also execute, under an instruction given by the support device 300, a maintenance operation for the PLC 100 itself. More specifically, for example, the support device 300 instructs, to the PLC 100, writing the data recorded in the support device 300.

In response to this, the PLC 100 writes the data recorded in the support device 300.

Upon the maintenance operation is executed, information identifying the maintenance operation is recorded in the PLC 100. As an example, the information identifying the maintenance operation is written by the support device 300. At this time, the support device 300 may record, into the support device 300 itself, the information identifying the maintenance operation.

As another example, the information identifying the maintenance operation is written by the PLC 100 itself. More specifically, when the PLC 100 writes, into the PLC 100 itself, data recorded in the recording medium 500 to execute a maintenance operation, the PLC 100 further writes, into the PLC 100 itself, information identifying the maintenance operation. At this time, the PLC 100 may record, into the recording medium 500, the information identifying the maintenance operation.

<Hardware Configuration of Support Device 300>

Figure 2:
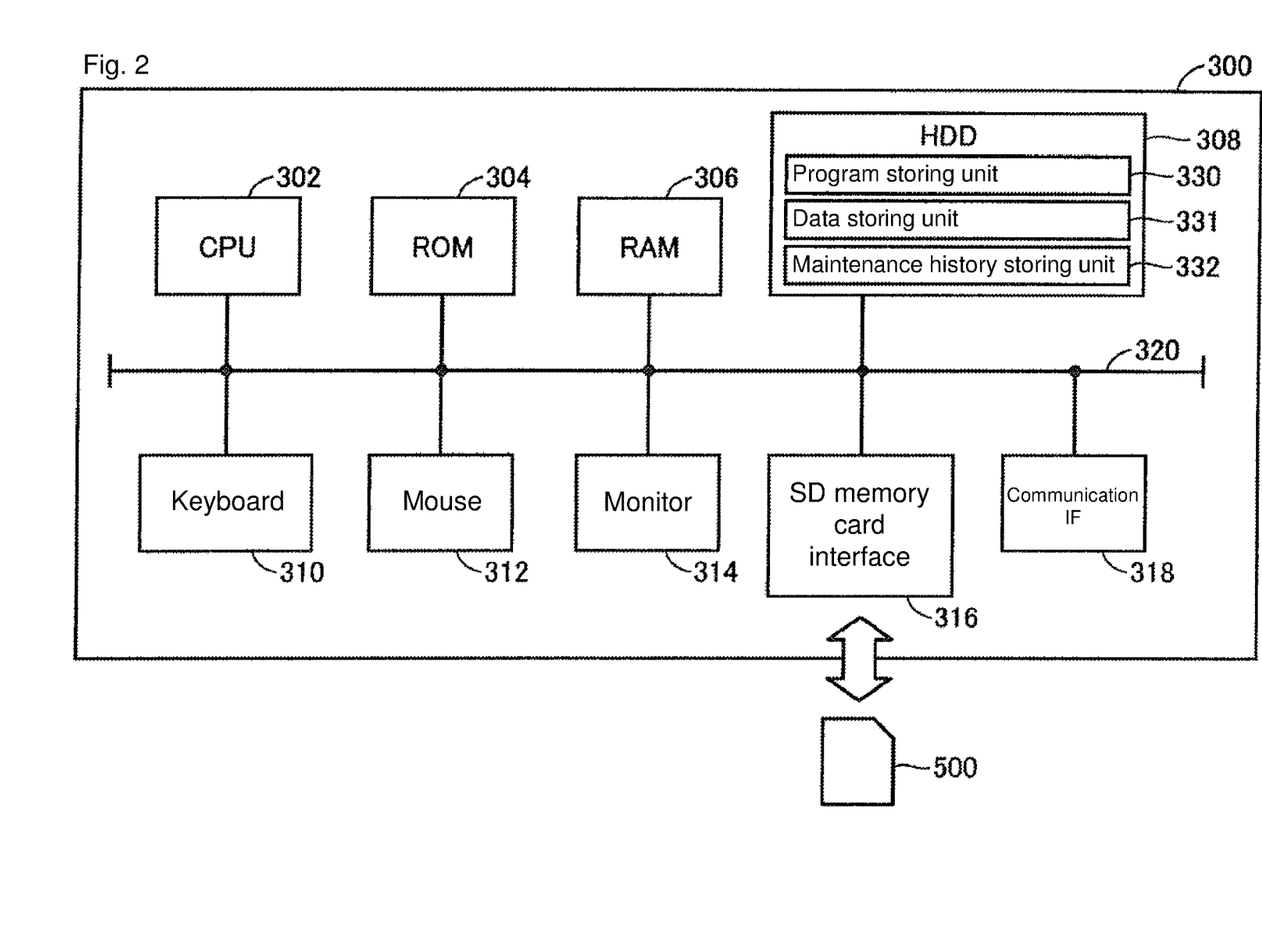
FIG. 2 is a view schematically illustrating an example hardware configuration of a support device.

FIG. 2 is a view schematically illustrating an example hardware configuration of the support device 300. As shown in FIG. 2, the support device 300 includes a Central Processing Unit (CPU) 302, a Read Only Memory (ROM) 304, a Random Access Memory (RAM) 306, and a hard disk drive (HDD) 308. The CPU 302 executes various programs including an Operating System (OS). The ROM 304 stores a Basic Input/Output System (BIOS) and a variety of data. The RAM 306 provides a work area for storing data required to execute a program with the CPU 302. The HDD 308 stores in a nonvolatile manner a program and other data to be executed with the CPU 302. The CPU 302 and the RAM 306 configure an example controller in the control system.

The hard disk 308 can store data (program data and/or batch file data) to be sent to the PLC 100 and a history of maintenance operations executed for the PLC 100. In FIG. 2, a program storing unit 330 provides an area for storing an application program for executing a maintenance operation. A data storing unit 331 provides an area for storing data to be sent to the PLC 100. A maintenance history storing unit 332 provides an area for storing a maintenance operation history. A program and data stored in the hard disk 308 can be recorded in a recording medium detachable to and from the support device 300 for distribution separately from the support device 300 itself.

The support device 300 further includes a keyboard 310 and a mouse 312 for accepting operations by a user, a monitor 314 for presenting information to the user, and a Secure Digital (SD) memory card interface 316. The embodiment applies an SD memory card as an example of the recording medium 500. The CPU 302 reads data recorded in the recording medium 500, and records data into the recording medium 500, via the SD memory card interface 316. The support device 300 further includes a communication interface (IF) 318 for communicating with the PLC 100 and other devices.

<Hardware Configuration of PLC 100>

Figure 3:
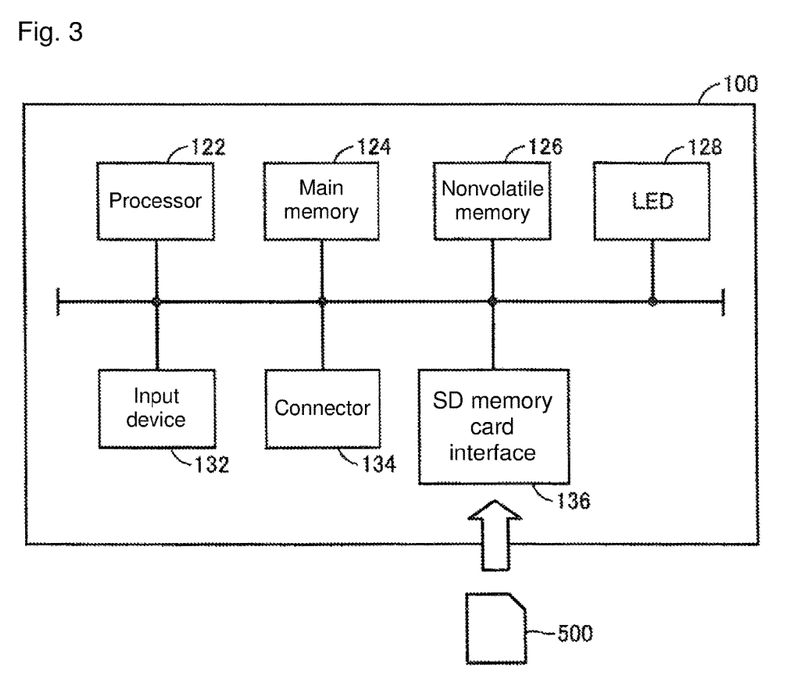
FIG. 3 is a view illustrating an example hardware configuration of a PLC.

FIG. 3 is a view illustrating an example hardware configuration of the PLC 100. As shown in FIG. 3, the PLC 100 includes a processor 122, a main memory 124, a nonvolatile memory 126, a Light Emitting Diode (LED) 128, an input device 132, a connector 134, and an SD memory card interface 136.

The processor 122 controls an operation of the PLC 100 by executing a program stored in the nonvolatile memory 126 or other storage devices. The main memory 124 can be used as a work area for the processor 122. The nonvolatile memory 126 stores a variety of data such as programs. The LED 128 is an example reporting unit, and is controlled by the processor 122 for a lighting operation. The input device 132 accepts an external input of information, and is configured with, for example, a button. The connector 134 is provided to connect with an external device including a recording medium such as Universal Serial Bus (USB) memory. The processor 122 can communicate with, via the connector 134, the external device. The SD memory card interface 136 is used to read data recorded in an SD memory card, an example of the recording medium 500. The processor 122 reads, via the SD memory card interface 136, the data recorded in the recording medium 500.

<Outline of Maintenance Operation>

Figure 4:
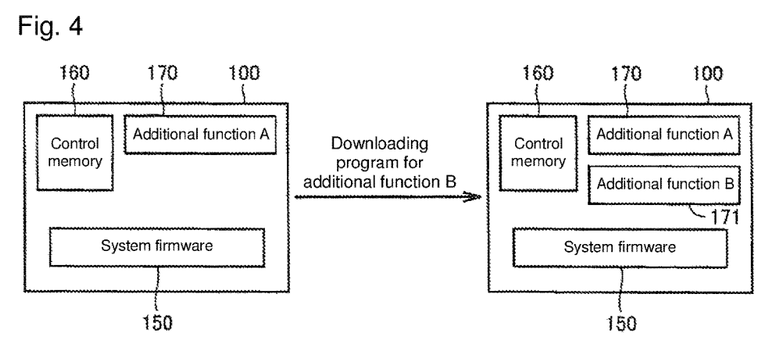
FIG. 4 is a view for schematically describing an example maintenance operation for the PLC in the control system according to the embodiment.

FIG. 4 is a view for schematically describing an example maintenance operation for the PLC 100 in the control system according to the embodiment. A left side in FIG. 4 shows the PLC 100 to which no maintenance operation is executed. A right side in FIG. 4 shows the PLC 100 to which a maintenance operation is executed.

The PLC 100 shown on the left side in FIG. 4 is installed with system firmware 150 and an additional function A (program for achieving the function) 170. The system firmware is software providing a basic functionality of the PLC 100. The system firmware includes, for example, software for achieving the basic functionality (program execution, communication, sensing, and other functions) of the PLC 100, an Operating System (OS), or software for controlling a hardware resource (for example, display or memory) mounted on the PLC 100.

The additional function is particular to a production apparatus in which the PLC 100 is mounted. Example functions include temperature control function and special communication function. In addition, different from the basic functionality of the PLC 100, the additional function is added by a manufacturer of the PLC 100 for higher competitiveness to achieve an expected, higher value for the PLC 100. That is, the application functionality may differ depending on a PLC 100, and, in addition, depending on a production apparatus onto which a control device is mounted. The application functionality (additional function) is also called as "add-on firmware," and is achieved by a type of firmware for the PLC 100.

The system firmware 150 and the additional function A170 are stored in, for example, the nonvolatile memory 126. In addition, the PLC 100 includes a control memory 160 for storing information for identifying a maintenance operation for the PLC 100. The control memory 160 includes, for example, the nonvolatile memory 126. In the PLC 100, the processor 122 executes the additional function A170 to achieve a particular function.

As an example maintenance operation for the PLC 100, the support device 300 writes, into the nonvolatile memory 126 of the PLC 100, an additional function B (application program for achieving the function). Accordingly, a state of the PLC 100 shifts to another state shown on the right side in FIG. 4. As shown to the right side in FIG. 4, the PLC 100 further includes an additional function B171.

At this point, the PLC 100 can execute a maintenance operation for the PLC 100 itself. More specifically, the processor 122 of the PLC 100 can write, into the nonvolatile memory 126, an application program used for the additional function B and recorded in the recording medium 500. In addition, under an instruction given by the support device 300, the processor 122 writes, into the nonvolatile memory 126, data recorded in the data storing unit 331 of the support device 300.

<Maintenance Operation History Information (PLC 100)>

Figure 5:
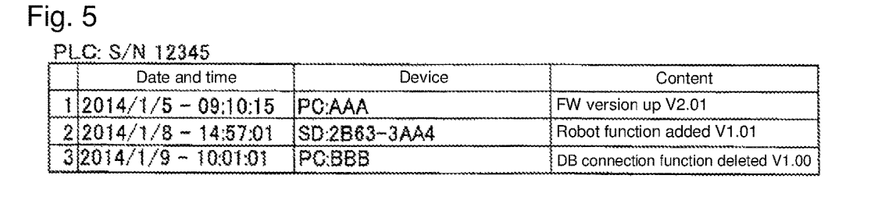
FIG. 5 is a schematic view illustrating an example maintenance operation history stored in a nonvolatile memory of the PLC.

In the control system according to the embodiment, the PLC 100 stores a history of maintenance operations (maintenance operation history) for the PLC 100. FIG. 5 is a schematic view illustrating an example maintenance operation history stored in the nonvolatile memory 126 of the PLC 100.

As shown in FIG. 5, the maintenance operation history includes dates and time when maintenance operations are executed, information identifying a device that has provided data on each of the maintenance operations ("Device" in FIG. 5), and contents of the maintenance operations. Each of the contents is, for example, a name of a downloaded program. In addition, the history is assigned with a number identifying each of the maintenance operations.

For example, a maintenance operation shown at "1" in FIG. 5 is a version up of a firmware (FW) program (a type of system firmware) to V2.01 started (or completed) at 09:10:15 on Jan. 5, 2014, and means that data is provided by a computer (PC) identified by an ID "AAA." An ID of a PC is an example of information identifying the support device 300. In the embodiment, a computer with an ID "AAA" means the support device 300. That is, the maintenance operation shown at "1" means that the maintenance operation has been executed by the support device 300. A process content of "version up" is identified, when the maintenance operation starts, in accordance with a content of data recorded in the nonvolatile memory 126. More specifically, the CPU 302 determines that, when a maintenance operation starts, and a program having a file name identical to a file name of another program to be written through the maintenance operation and a version older than a version of the other program is written in the nonvolatile memory 126 of the PLC 100, a content of the maintenance operation is a "version up."

A maintenance operation shown at "3" in FIG. 5 means a deletion of a database (DB) connection function (program for the function) with a version V1.00 started (or completed) at 10:01:01 on Jan. 9, 2014. A "Device" value of the maintenance operation shown at "3" is "PC: BBB." This means that a computer identified by an ID "BBB" has executed the above described deletion. Deleting a program can include not only deleting data of the program from the nonvolatile memory 126, but also making the data of the program unreadable by the processor 122 by rewriting a directory or taking another action.

On the other hand, the CPU 302 determines that, when a maintenance operation starts, and a program having a file name identical to a file name of another program to be written through the maintenance operation is not written in the nonvolatile memory 126 of the PLC 100, a content of the maintenance operation is "addition."

<Maintenance Operation History Information (Support Device 300)>

Figure 6:
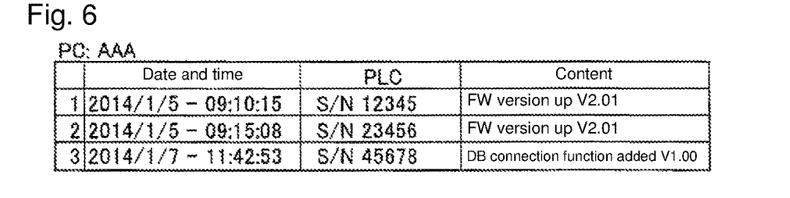
FIG. 6 is a schematic view illustrating an example maintenance operation history stored in a maintenance history storing unit of the support device.

In the control system according to the embodiment, the support device 300 stores, as a maintenance operation history, information identifying a maintenance operation. FIG. 6 is a schematic view illustrating an example maintenance operation history stored in the maintenance history storing unit 332 of the support device 300.

As shown in FIG. 6, the maintenance operation history includes dates and time when maintenance operations are executed, information identifying a PLC subject to each of the maintenance operations ("PLC" in FIG. 6), and contents of the maintenance operations. In addition, the history is assigned with a number identifying each of the maintenance operations.

For example, a maintenance operation shown at "3" in FIG. 6 is an addition of a database (DB) connection function (program for the function) with a version V1.00 to a PLC identified by a serial number "45678" started (or completed) at 11:42:53 on Jan. 7, 2014. The serial number is a specific example of an ID of the PLC 100.

<Maintenance Operation History Information (Recording Medium 500)>

Figure 7:
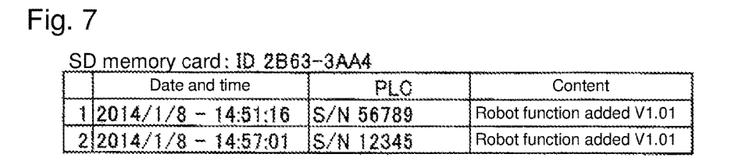
FIG. 7 is a schematic view illustrating an example maintenance operation history recorded in a recording medium.

In the control system according to the embodiment, the PLC 100 writes, into the nonvolatile memory 126, data recorded in the recording medium 500 to execute a maintenance operation, and then writes, into the recording medium 500, information identifying the maintenance operation. FIG. 7 is a schematic view illustrating an example maintenance operation history recorded in the recording medium 500.

As shown in FIG. 7, the maintenance operation history includes dates and time when maintenance operations are executed, information identifying a PLC subject to each of the maintenance operations ("PLC" in FIG. 7), and contents of the maintenance operations. In addition, the history is assigned with a number identifying each of the maintenance operations.

For example, a maintenance operation shown at "1" in FIG. 7 is an addition of a robot function (program for the function) with a version V1.01 to a PLC identified by a serial number "56789" started (or completed) at 14:51:16 on Jan. 8, 2014.

<Maintenance Operation Executed by Support Device 300 (1)>

Figure 8:
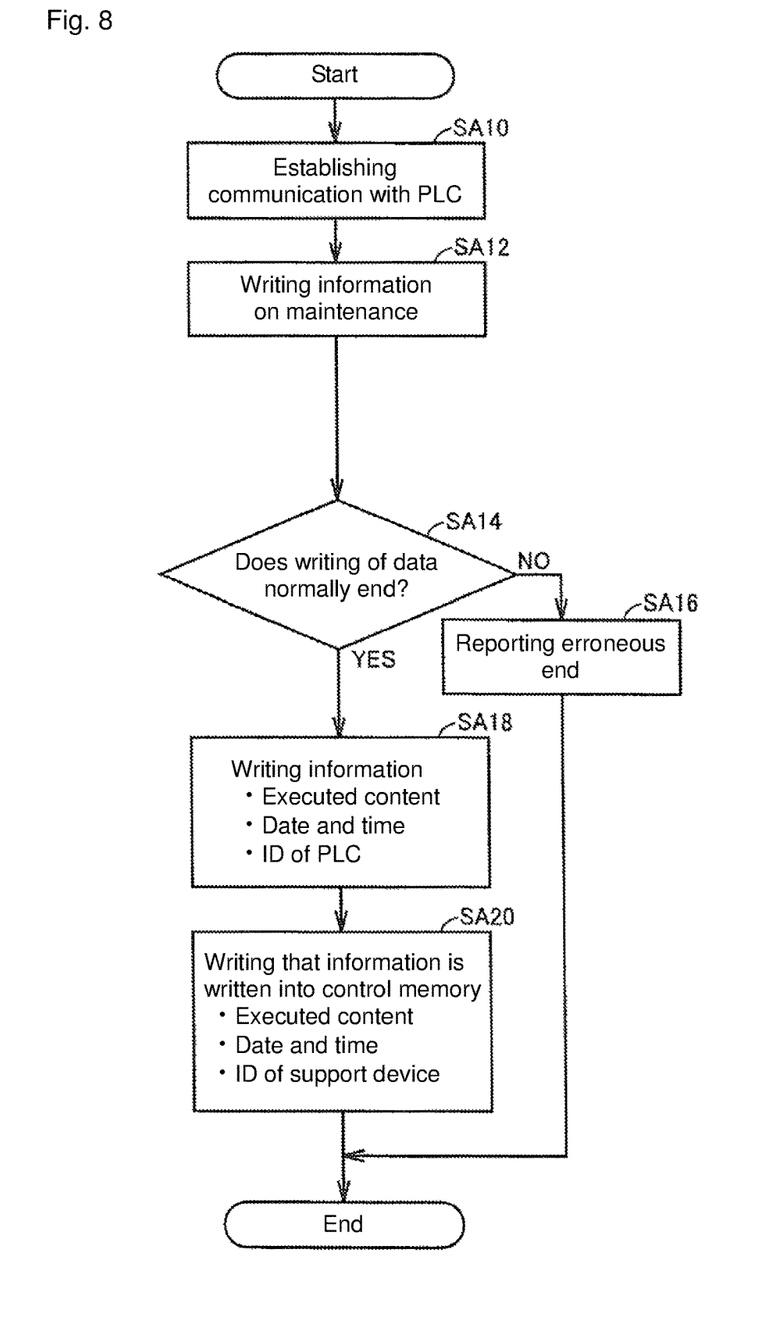
FIG. 8 is a flow chart of an example maintenance operation process executed, for the PLC, by the support device.

FIG. 8 is a flow chart of an example maintenance operation process executed, for the PLC 100, by the support device 300.

With reference to FIG. 8, in a step SA10, the CPU 302 establishes a communication with the PLC 100. More specifically, for example, an operator inputs, into the support device 300, an instruction on a maintenance operation for the PLC 100. In response to this, the CPU 302 requests the PLC 100 to establish a communication. The processor 122 of the PLC 100 responds the request and establishes the communication between the support device 300 and the PLC 100. Next, a control is allowed to proceed to a step SA12.

In the step SA12, the CPU 302 writes, into the nonvolatile memory 126 of the PLC 100, specified data to be written into the PLC 100. Next, the control is allowed to proceed to a step SA14.

The above described operator, for example, inputs, into the support device 300, information specifying the data to be written. More specifically, the program storing unit 330 of the HDD 308 stores information associating a function with a program for achieving the function. Next, the operator specifies the function. Accordingly, the CPU 302 identifies, as the data to be written into the PLC 100, the program associated with the specified function.

In the step SA14, the CPU 302 determines if writing the data into the nonvolatile memory 126 normally ends. Next, upon the CPU 302 determines that the writing normally ends, the CPU 302 allows the control to proceed to a step SA18 (YES in the step SA14). On the other hand, upon the CPU 302 determines that the writing the data erroneously ends, the CPU 302 causes the control to proceed to a step SA16 (NO in the step SA14).

In the step SA16, the CPU 302 reports that the maintenance operation erroneously ends, and ends the process shown in FIG. 8. The report is achieved, for example, by displaying on the monitor 314, a message indicating that the maintenance operation erroneously ends.

In the step SA18, the CPU 302 writes, into the maintenance history storing unit 332, three types of information (A1 to A3) as shown below.
A1) Executed content
A2) Date and time
A3) ID of PLC Accordingly, information on a maintenance operation is added in a history as shown in FIG. 6. "A1) Executed content" corresponds to the "Content" shown in FIG. 6. "A2) Date and time" corresponds to the "Date and time" shown in FIG. 6. "A3) ID of PLC" is an ID of the PLC 100 (an example of information identifying the PLC 100), and corresponds to the "PLC" shown in FIG. 6. The CPU 302 reads the ID of the PLC 100 from the nonvolatile memory 126 or other memories of the PLC 100.

Next, the control is allowed to proceed to a step SA20.

In the step SA20, the CPU 302 writes, into the control memory 160 of the PLC 100, three types of information (B1 to B3) as shown below, and ends the process shown in FIG. 8.
B1) Executed content
B2) Date and time
B3) ID of support device Upon the information B1 to B3 is written into the control memory 160, information on the maintenance operation is added in a history as shown in FIG. 5. "B1) Executed content" corresponds to the "Content" shown in FIG. 5. "B2) Date and time" corresponds to the "Date and time" shown in FIG. 5. "B3) ID of support device" is an ID of the support device 300, and corresponds to the "Device" shown in FIG. 5. The ID of the support device 300 is stored in, for example, the HDD 308.

<Maintenance Operation Executed by Support Device 300 (2)>

Figure 9:
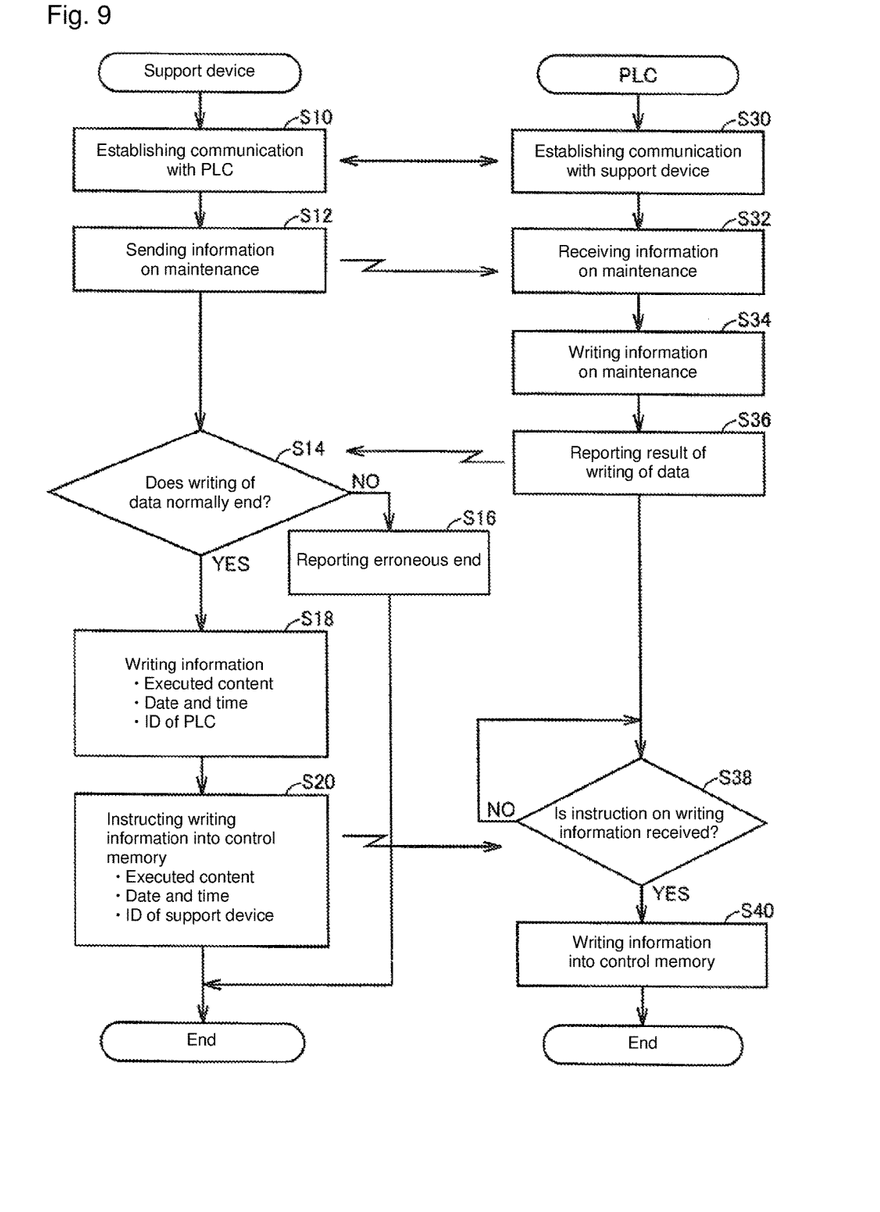
FIG. 9 is a flow chart of another example maintenance operation process executed, for the PLC, by the support device.

FIG. 9 is a flow chart of another example maintenance operation process executed, for the PLC 100, by the support device 300. In FIG. 9, a process executed by the CPU 302 of the support device 300 is shown on a left side, while a process executed by the processor 122 of the PLC 100 is shown on a right side.

First, a communication is established between the support device 300 and the PLC 100 (in steps S10 and S30). More specifically, for example, an operator inputs, into the support device 300, an instruction on a maintenance operation for the PLC 100. In response to this, the CPU 302 requests the PLC 100 to establish a communication. The processor 122 of the PLC 100 responds the request and establishes the communication between the support device 300 and the PLC 100.

In a step S12, the CPU 302 sends information on maintenance to the PLC 100 to instruct the PLC 100 to write the information on maintenance. The information on maintenance is, for example, data specified in the support device 300 so as to be written into the PLC 100. The data is specified, for example, in an identical or similar aspect to data specified in the step SA12.

In a step S32, the processor 122 receives the information on maintenance. Next, a control is allowed to proceed to a step S34.

In the step S34, the processor 122 writes, into the nonvolatile memory 126, the information on maintenance received in the step S32. Next, the control is allowed to proceed to a step S36.

In the step S36, the processor 122 reports to the support device 300 a result of writing of data executed in the step S34. The result to be reported is that, for example, the writing of data normally ends or erroneously ends.

In a step S14, the CPU 302 determines if the result reported by the PLC 100 indicates that the writing of data normally ends. Next, upon the CPU 302 determines that the result indicates that the writing of data normally ends, the CPU 302 allows the control to proceed to a step S18 (YES in the step S14). On the other hand, upon the CPU 302 determines that the result indicates that the writing of data erroneously ends, the CPU 302 causes the control to proceed to a step S16 (NO in the step S14).

In the step S16, the CPU 302 reports that the maintenance operation erroneously ends, and ends the process shown in FIG. 9. The report is achieved, for example, by displaying on the monitor 314 a message indicating that the maintenance operation erroneously ends.

In the step S18, the CPU 302 writes, into the maintenance history storing unit 332, three types of information (A1 to A3) as shown below.
A1) Executed content
A2) Date and time
A3) ID of PLC The information (A1 to A3) to be written in the step S18 is identical to the information (A1 to A3) written in the step SA18 (see FIG. 8).

Next, the control is allowed to proceed to a step S20.

In the step S20, the CPU 302 instructs the PLC 100 to write, into the control memory 160, three types of information (B1 to B3) as shown below, and ends the process shown in FIG. 9.
B1) Executed content
B2) Date and time
B3) ID of support device The information (B1 to B3) instructed to be written, in the step S20, is identical to the information (B1 to B3) written, into the control memory 160, by the CPU 302 in the step SA20 (see FIG. 8).

In a step S38, the processor 122 determines if the instruction is received. The processor 122 stands by until the processor 122 determines that the instruction is received (NO in the step S38). Next, upon the processor 122 determines that the instruction is received, the processor 122 allows the control to proceed to a step S40 (YES in the step S38).

In the step S38, the processor 122 follows the instruction from the support device 300 to write, into the control memory 160, the information (B1 to B3), and ends the process shown in FIG. 9.

<Maintenance Operation Using Recording Medium 500>

Figure 10:
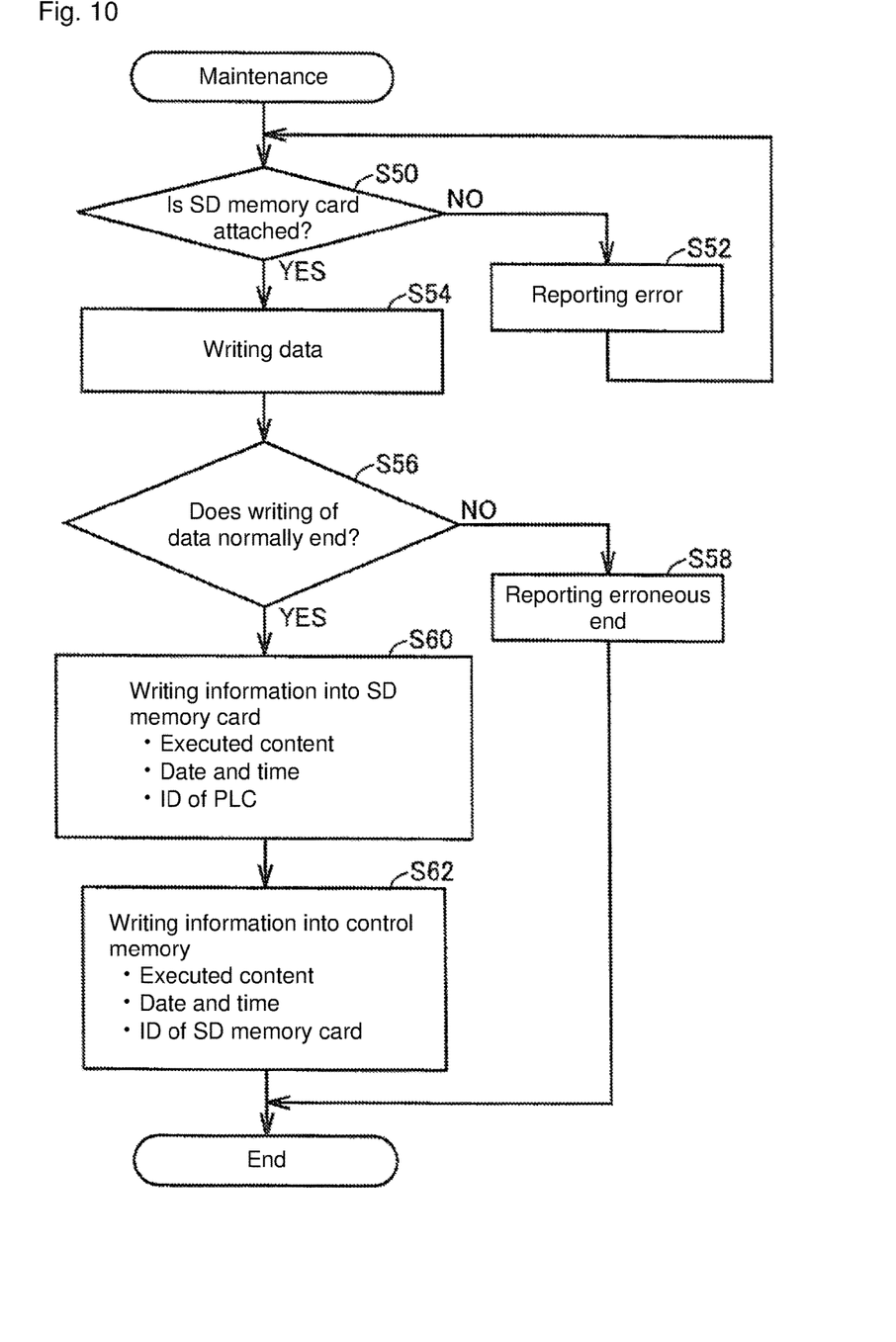
FIG. 10 is a flow chart of an example maintenance operation process executed by the PLC using the recording medium.

FIG. 10 is a flow chart of an example maintenance operation process executed when the PLC 100 writes, into the nonvolatile memory 126, data stored in the recording medium 500. The process shown in FIG. 10 starts, for example, when an operator operates a start button (an example of the input device 132) of the PLC 100.

With reference to FIG. 10, the processor 122 determines, in a step S50, if an SD memory card (recording medium 500) is attached to the SD memory card interface 136. Next, upon the processor 122 determines that the SD memory card is attached, the processor 122 allows a control to proceed to a step S54 (YES in the step S50). Upon the processor 122 determines that the SD memory card is not attached, the processor 122 causes the control to proceed to a step S52 (NO in the step S50).

In the step S52, the processor 122 reports an error indicating that the recording medium 500 is not attached, and returns the control to the step S50. For example, the processor 122 turns on the LED 128 to report the error.

In the step S54, the processor 122 executes a maintenance operation. More specifically, the processor 122 writes, into the nonvolatile memory 126, information on maintenance recorded in the recording medium 500. The information on maintenance is, for example, data of system firmware or an additional function recorded in the recording medium 500 so as to be written into the PLC 100.

In a step S56, the processor 122 determines if the maintenance operation normally ends in the step S54. The processor 122 determines that, when writing of data normally ends in the step S54, for example, the maintenance operation normally ends. In addition, the processor 122 determines that, when the writing of data erroneously ends in the step S54, the maintenance operation erroneously ends. Next, upon the processor 122 determines that the maintenance operation normally ends, the processor 122 allows the control to proceed to a step S60 (YES in the step S56). Upon the processor 122 determines that the maintenance operation erroneously ends, the processor 122 causes the control to proceed to a step S58 (NO in the step S56).

In the step S58, the processor 122 reports an error indicating that the maintenance operation erroneously ends, and ends the process shown in FIG. 10. For example, the processor 122 causes the LED 128 to blink to report the error.

In the step S60, the processor 122 writes, into the recording medium 500 (SD memory card), three types of information (C1 to C3) as shown below.

C1) Executed content
C2) Date and time
C3) ID of PLC

Accordingly, information on the maintenance operation is added in a history as shown in FIG. 7. "C1) Executed content" corresponds to the "Content" shown in FIG. 7. "C2) Date and time" corresponds to the "Date and time" shown in FIG. 7. "C3) ID of PLC" is an ID of the PLC 100, and corresponds to the "PLC" shown in FIG. 7.

Next, the control is allowed to proceed to a step S62.

In the step S62, the processor 122 writes, into the control memory 160, three types of information (D1 to D3) as shown below.

D1) Executed content
D2) Date and time
D3) ID of SD memory card

Accordingly, information on the maintenance operation is added in a history as shown in FIG. 5. "D1) Executed content" corresponds to the "Content" shown in FIG. 5. "D2) Date and time" corresponds to the "Date and time" shown in FIG. 5. "D3) ID of SD memory card" is an ID of the recording medium 500 (an example of information identifying the recording medium 500), and corresponds to the "Device" shown in FIG. 5. The processor 122 reads, from the recording medium 500, the ID of the recording medium.

Next, the processor 122 ends the process shown in FIG. 10.

<Displaying Maintenance Operation History (1)>

The CPU 302 can display, on the monitor 314, a maintenance operation history stored in the maintenance history storing unit 332 (see FIG. 6).

In addition, the CPU 302 can display, on the monitor 314, a maintenance operation history stored in the control memory 160 (see FIG. 5).

Figure 11:
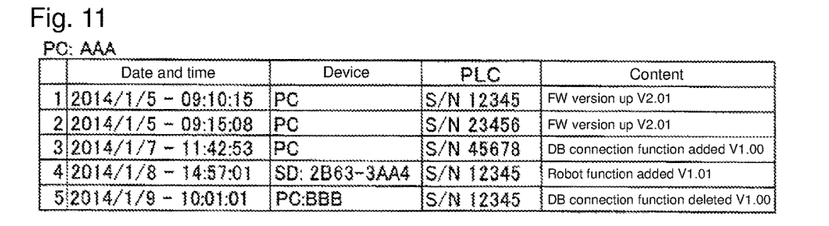
FIG. 11 is a view illustrating an example display in which a maintenance operation history in the support device and a maintenance operation history in the PLC are combined.

Further, the CPU 302 can display the maintenance operation history stored in the maintenance history storing unit 332 and the maintenance operation history stored in the control memory 160 in a combined manner. FIG. 11 is a view illustrating an example display in which a maintenance operation history in the support device 300 and a maintenance operation history in the PLC 100 are combined.

The maintenance operation history shown in FIG. 11 includes "Date and time," "Device," "PLC," and "Content." The "Date and time" shown in FIG. 11 corresponds to the "Date and time" shown in FIGS. 5 and 6.

The "Device" shown in FIG. 11 corresponds to the "Device" shown in FIG. 5. For a history of maintenance operations for the support device 300, values under the "Device" shown in FIG. 11 are "PC."

The "PLC" shown in FIG. 11 corresponds to the "PLC" shown in FIG. 6. For a history of maintenance operations for the PLC 100, values under the "PLC" shown in FIG. 11 are IDs of PLCs 100.

In addition, in the maintenance operation history shown in FIG. 11, a number is assigned to each of the maintenance operations. Maintenance operations shown at "1" to "3" in FIG. 11 correspond to maintenance operations shown at "1" to "3" in FIG. 6. Maintenance operations shown at "4" and "5" shown in FIG. 11 respectively correspond to maintenance operations shown at "2" and "3" in FIG. 5.

A maintenance operation shown at "1" in FIG. 5 and a maintenance operation shown at "1" in FIG. 6 are duplicated. "Duplicate" means that, for example, a maintenance content, a date and time, and an ID of a PLC 100 subject to the maintenance operation are identical. In this case, in an example shown in FIG. 11, the maintenance operation shown at "1" in FIG. 5 and the maintenance operation shown at "1" in FIG. 6 are indicated as a single maintenance operation (number "1" shown in FIG. 11).

The CPU 302 can process a history as shown in FIG. 11 with a predetermined action. For example, the CPU 302 can extract, from the history shown in FIG. 11, information on a maintenance operation for a PLC 100 with a particular serial number.

<Displaying Maintenance Operation History (2)>

The CPU 302 can retrieve, into the HDD 308, a maintenance operation history stored in the control memory 160 of the PLC 100. In addition, the CPU 302 can display, when a recording medium 500 is attached to the SD memory card interface 316, a maintenance operation history stored in the recording medium 500 with a history stored in the maintenance history storing unit 332 and the history retrieved from the PLC 100 in a combined manner.

Figure 12:
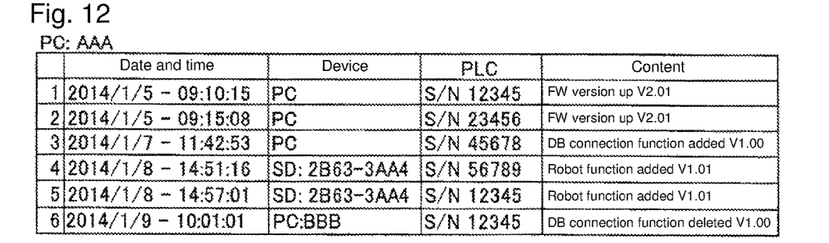
FIG. 12 is a view illustrating an example display of a maintenance operation history when a recording medium with an ID "2B63-3AA4" is attached.

FIG. 12 is a view illustrating an example display of a maintenance operation history when a recording medium 500 with an ID "2B63-3AA4" is attached.

The history shown in FIG. 12 includes values identical or similar to values in items ("Date and time," "Device," "PLC," and "Content") in the history shown in FIG. 11. Maintenance operations shown at "1" to "3" in FIG. 12 correspond to maintenance operations "1" to "3" in FIG. 11. A maintenance operation shown at "4" in FIG. 12 corresponds to information on a maintenance operation stored only in the recording medium 500. A maintenance operation shown at "5" in FIG. 12 corresponds to a maintenance operation shown at "4" in FIG. 11.

When a maintenance operation history stored in the recording medium 500 and a history stored in the maintenance history storing unit 332 or a history retrieved from the PLC 100 are duplicated in part, as shown in FIG. 12, the CPU 302 can display only either duplicated parts.

A maintenance operation shown at "6" in FIG. 12 corresponds to a maintenance operation shown at "5" in FIG. 11.

<Displaying Maintenance Operation History (3)>

The CPU 302 can retrieve, into the HDD 308, a maintenance operation history stored in the control memory 160 of the PLC 100. The CPU 302 can further retrieve, into the HDD 308, a maintenance operation history stored in the recording medium 500 (ID "2B63-3AA4"). Further, the CPU 302 can display, when another recording medium 500 is attached to the SD memory card interface 316, a maintenance operation history stored in the other recording medium 500 (ID "3C87-2EB5") with a history stored in the maintenance history storing unit 332 and the histories retrieved from the PLC 100 and the recording medium 500 in a combined manner.

Figure 13:
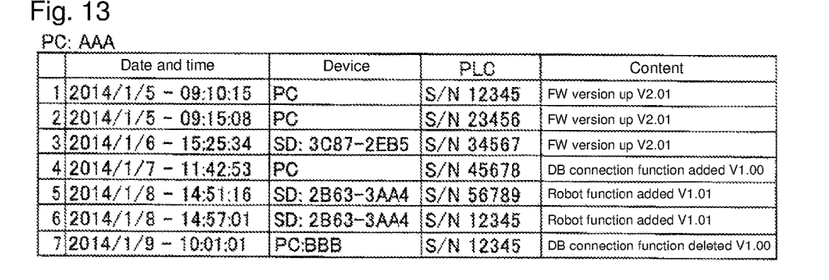
FIG. 13 is a view illustrating an example display of a maintenance operation history when a recording medium with an ID "3C87-2EB5" is attached.

FIG. 13 is a view illustrating an example display of a maintenance operation history when a recording medium 500 with an ID "3C87-2EB5" is attached.

The history shown in FIG. 13 includes values identical or similar to values in items ("Date and time," "Device," "PLC," and "Content") in the history shown in FIG. 11. Maintenance operations shown at "1" to "2" and "4" to "6" in FIG. 13 respectively correspond to maintenance operations shown at "1" to "2" and "3" to "5" in FIG. 12. A maintenance operation shown at "3" in FIG. 13 corresponds to information on a maintenance operation stored only in the recording medium 500 (ID "3C87-2EB5"). A maintenance operation shown at "7" in FIG. 13 corresponds to a maintenance operation shown at "5" in FIG. 11.

When a maintenance operation history stored in the recording medium 500, a history stored in the maintenance history storing unit 332 or a history already retrieved from the PLC 100 or the recording medium 500 are duplicated in part, as shown in FIG. 13, the CPU 302 can display only either duplicated parts.

The above described embodiment can record, into the PLC 100 itself, a maintenance operation history for the PLC 100. Accordingly, with the support device 300, the maintenance operation history for the PLC 100 can be reviewed.

The above described history can include a device recording data written into the PLC 100 in each maintenance operation (a support device 300 or a recording medium 500). Accordingly, a device involved in executing a maintenance operation can be identified.

In addition, in a control system requiring an input of a user ID for executing a maintenance operation, a history can include information on a user who has executed a maintenance operation. Accordingly, a person who has executed a maintenance operation can be checked.

The embodiments disclosed in this time are intended for illustrative purposes only in all respects, and should not be construed as restrictive. The scope of the present invention is indicated by the claims, not the above description, and intends to include all modifications and alterations within the scope of the claims and equivalent meanings and ranges.

DESCRIPTION OF SYMBOLS

100 PLC
122 Processor
124 Main memory
126 Nonvolatile memory
132 Input device
134 Connector
136,316 SD memory card interface
150 System firmware
160 Control memory
300 Support device
308 Hard disk
314 Monitor
330 Program storing unit
331 Data storing unit
332 Maintenance history storing unit
500 Recording medium

The invention claimed is:

1. A control device for controlling a production system, the production system including at least one of a relay and a servo motor driver driving a motor, the control device comprising:
a storage device;
a communication interface, the communication interface enabling communication between the control device and a support device; and
a processor to perform operations comprising:
receiving, via the communication interface, a communication request from the support device,
receiving, via the communication interface, firmware maintenance information from the support device,
writing, into the storage device, the firmware maintenance information,
sending, via the communication interface, a result of writing the firmware maintenance information,
determining that an instruction to write a description associated with the firmware maintenance information, a date and time of when the firmware maintenance information was written, and an identification of the support device has been received from the support device,
writing, into the storage device and in response to the determining, the description, the date and time, and the identification, and
controlling the at least one of the relay and the servo motor driver based on the firmware maintenance information.

2. The control device according to claim 1, wherein the description includes information identifying a name of the firmware maintenance information written in the storage device.

3. The control device according to claim 1, wherein the description includes information identifying that the firmware maintenance information is deleted.

4. A control system. comprising:
a control device; and
a support device, wherein:
the control device comprises a first storage device and a first processor to perform operations for controlling a production system, the production system including at least one of a servo motor driver driving a motor;
the support device comprises a second storage device and a second processor to perform operations to communicate with the first processor of the control device;
the control device further comprises a first communication interface, the first communication interface enabling communication between the control device and the support device;
the support device further comprises a second communication interface, the second communication interface enabling communication between the support device and the control device;
the second processor to perform operations further comprising:

sending, via the second communication interface, a communication request to the first processor, sending, via the second communication interface, firmware maintenance information to the first processor, receiving, via the second communication interface, a result of the first processor writing the firmware maintenance information to the first storage device, determining that the firmware maintenance information was successfully written based on the received result, writing, into the second storage device, a description associated with the firmware maintenance information a, date and time of when the firmware maintenance information was written, and an identification of the control device, and sending, via the second communication interface, an instruction to write the description, the date and time, and an identification of the support device to the first storage device; and the first processor to perform operations further comprising:

receiving, via the first communication interface, the communication request from the second processor, receiving, via the first communication interface, the firmware maintenance information from the second processor, writing, into the first storage device, the firmware maintenance information, sending, via the first communication interface, the result of writing the firmware maintenance information, determining that the instruction from the second processor has been received, writing, into the first storage device and in response to the determining, the description, the date and time, and the identification of the support device, and controlling the at least one of the relay and the servo motor driver based on the firmware maintenance information.

5. The control system according to claim 4, wherein the support device further comprises a display, and wherein the display displays a history of the firmware maintenance information.

6. A support device comprising:

a processor;

a communication interface, the communication interface enabling communication between the support device and a control device, the control device controlling a production system including at least one of a relay and a servo motor driver driving a motor; and a storage device, the processor to perform operations comprising:

sending, via the communication interface, a communication request to the control device, sending, via the communication interface, firmware maintenance information to the control device, receiving, via the communication interface, a result of the control device writing the firmware maintenance information to the control device, determining that the firmware maintenance information was successfully written based on the received result, writing, into the storage device, a description associated with the firmware maintenance information, a date and time of when the firmware maintenance information was written, and an identification of the control device, and sending, via the communication interface, an instruction to write the description, the date and time, and an identification of the support device to the control device, wherein the control device controls the at least one of the relay and the servo motor driver based on the firmware maintenance information.

7. The support device according to claim 6, wherein the support device further comprises a display, and wherein the display displays a history of the firmware maintenance information.

8. A control device maintenance management method to be executed by a processor of a control device for controlling a production system, the production system including at least one of a relay and a servo motor driver driving a motor, the control device comprising storage device and a communication interface, the communication interface enabling communication between the control device and a support device, the control-device maintenance management method comprising:

receiving, via the communication interface, a communication request from the support device, receiving, via the communication interface, firmware maintenance information from the support device, writing, into the storage device, the firmware maintenance information, sending, via the communication interface, a result of writing the firmware maintenance information, determining that an instruction to write a description associated with the firmware maintenance information, a date and time of when the firmware maintenance information was written, and an identification of the support device has been received from the support device, writing, into the storage device and in response to the determining, the description, the date and time, and the identification, and controlling the at least one of the relay and the servo motor driver based on the firmware maintenance information.

9. A support device maintenance management method to be executed by a processor of a support device configured to communicate with a control device for controlling a production system including at least one of a rely and a servo motor driver driving a motor, the support device comprising a storage device and a communication interface, the communication interface enabling communication between the support device and the control device, the support device maintenance management method comprising:

sending, via the communication interface, a communication request to the control device, sending, via the communication interface, firmware maintenance information to the control device, receiving, via the communication interface, a result of the control device writing the firmware maintenance information to the control device, determining that the firmware maintenance information was successfully written based on the received result, writing, into the storage device, a description associated with the firmware maintenance information, a date and time of when the firmware maintenance information was written, and an identification of the control device, and sending, via the communication interface, an instruction to write the description, the date and time, and an identification of the support device to the control device, wherein the control device controls the at least one of the relay and the servo motor driver based on the firmware maintenance information.

10. The support device maintenance management method according to claim 9, wherein the support device further comprises a display, and wherein the display displays a history of the firmware maintenance information.

* * * * *